United States Patent [19]

Grube et al.

[11] Patent Number: 5,239,680

[45] Date of Patent: Aug. 24, 1993

[54] COMMUNICATION SYSTEM MESSAGE AUTHENTICATION

[75] Inventors: Gary W. Grube, Palatine; Michael D. Sasuta, Mundelein, both of Ill.

[73] Assignee: Motorola, Inc., Schaumburg, Ill.

[21] Appl. No.: 675,383

[22] Filed: Mar. 26, 1991

[51] Int. Cl.[5] .................... H04B 7/00; H04M 11/00
[52] U.S. Cl. .................... 455/38.1; 455/54.2; 455/63; 379/63
[58] Field of Search ............ 455/33, 34, 38, 54, 455/53, 56, 63, 62, 186; 379/63; 340/825.34, 825.31, 825.22

[56] References Cited

U.S. PATENT DOCUMENTS

| | | | |
|---|---|---|---|
| 4,312,074 | 1/1982 | Pautler et al. | 371/69 |
| 4,541,095 | 9/1985 | Vries | 340/825.44 |
| 4,654,481 | 3/1987 | Corris et al. | 379/62 |
| 4,670,905 | 6/1987 | Sandvos et al. | 455/33 |
| 4,692,945 | 9/1987 | Zaunek | 455/38 |
| 4,723,264 | 2/1988 | Sasuta et al. | 379/58 |
| 4,876,738 | 10/1989 | Selby | 455/33 |
| 4,910,510 | 5/1990 | Davis et al. | 455/38.1 |

Primary Examiner—Reinhard J. Eisenzopf
Assistant Examiner—Christine K. Belzer
Attorney, Agent, or Firm—Susan L. Lukasik; Raymond A. Jenski; Steven G. Parmelee

[57] ABSTRACT

Authentication of system status OSWs in a trunked communication system is provided by first verifying (411) that a received system ID (313) matches a pre-programmed system ID. A system status OSW must then be matched twice before the information in the system status OSW is programmed into a communication unit (115), thus limiting the possibility of false decoding of system status OSWs.

4 Claims, 2 Drawing Sheets

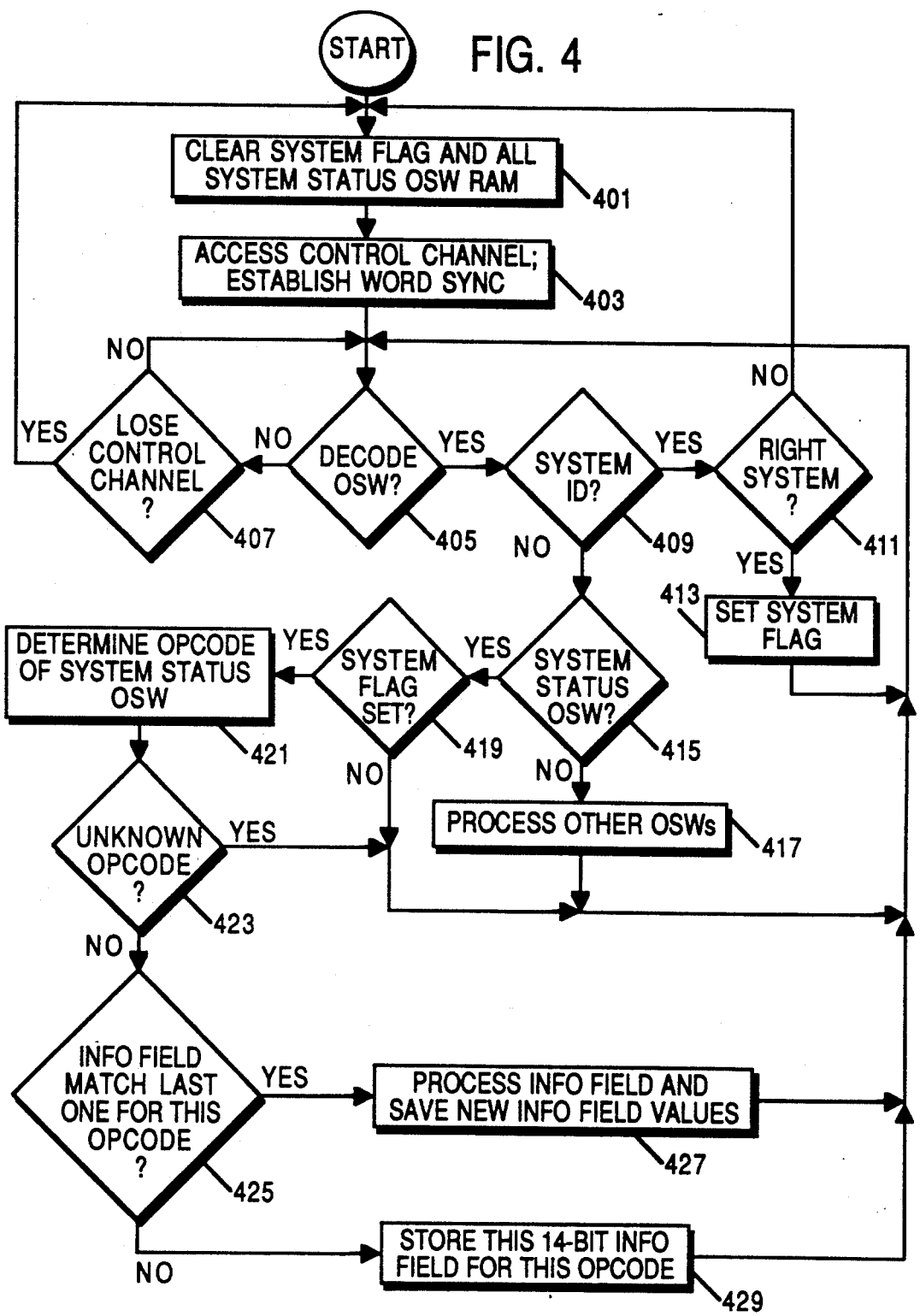

COMMUNICATION SYSTEM MESSAGE AUTHENTICATION

FIELD OF THE INVENTION

This invention relates to trunked radio systems. More particularly, this invention relates to outbound signalling words in trunked radio systems.

BACKGROUND OF THE INVENTION

Trunked communication systems afford a highly efficient use of limited frequency spectrum. In both the private and public markets, more and more businesses, associations, and agencies are specifying trunked systems for their communication needs. In a trunked communication system, a central controller allocates a limited number of channels among many users. Generally, within a trunked system, the many users are organized into fleets, sub-fleets or groups, and individuals. Accordingly, each user has a fleet, group, and an individual identification (ID) code. Since the number of channels is far less than the number of users, the users must request and be granted a channel before they may communicate.

To initiate a group call, it is known for a requesting user to transmit an information packet, commonly referred to as a call request. The call request consists of an ID field containing the requesting user's fleet, group, and individual IDs, and a code which represents the type of call desired (a group call in this example). Generally, call requests are encoded with error correcting and/or other codes to form Inbound Signalling Words (ISWs) to facilitate communication. The central controller receives the ISW and extracts the call request. If a channel is available, the central (controller) formats an information packet, commonly referred to as a channel grant, which comprises the requesting user's fleet, group, and individual IDs, and a channel assignment field, which contains a code representing the channel upon which communications may commence. The central encodes the channel grant into an Outbound Signalling Word (OSW), which is transmitted to all users monitoring a selected one of the available channels designated as the control channel. If there is no channel available, the central formats and returns a Busy OSW. Upon receipt of the channel grant, the requesting user moves to the assigned channel and begins transmitting, while all other users in the same group as the requesting user move to the communications channel as listening units.

To maintain system integrity, the central occasionally transmits system status OSWs which inform the users within the system of various system information and conditions. A system OSW may contain connect tone data, availability of data channels, any limitations or subsequent return of telephone service, or other related information. Reprogramming communication units using a system status OSW is significantly faster than bringing each unit out of the field and in for servicing, which could easily take weeks or months in systems with a thousand or more units, consequently causing extensive loss of communication time.

Quite often, the RF coverage area of adjacent systems overlap. Consequently, a user may receive system status OSWs from two separate systems. This can have negative side effects, especially if the system status OSW contains program data for the communication unit. For example, the system status OSW may contain connect tone data, a sub-audible frequency for inbound signal identification by the communication unit on the assigned communications channel. Because the system may need to change the connect tone frequency at times, such as to avoid interference with a nearby system using the same connect tone frequency, a system status OSW is used to reprogram all the units in the system. If a communication unit receives a system status OSW containing connect tone frequency change data from a neighboring system, the unit may accept the new connect tone, program the new tone, and find that communication in its own system is no longer possible without reprogramming the communication unit manually. Similarly, an OSW incorrectly decoded due to poor signal conditions requires manual reprogramming as well.

Accordingly, a method of using system status OSWs to program communication units with limited influence to decoding nearby system's OSWs and falsing due to poor signal conditions is required.

BRIEF DESCRIPTION OF THE DRAWINGS

FIG. 4 is a flowchart showing system status OSW authentication in accordance with the invention.

DESCRIPTION OF A PREFERRED EMBODIMENT

The following describes a method and apparatus for decoding OSWs that is less susceptible to decoding nearby system's OSWs and falsing due to poor signal conditions.

A system status OSW and system ID OSW are transmitted every three seconds on the control channel to provide availability of system status to the communication units with minimal loss of data. The unit must authenticate the system status OSW a predetermined number of times while authenticating the data, thus reducing the occurrence of false decoding. These OSWs do not require an acknowledgment to prevent unnecessary traffic on the control channel.

Figure 1:
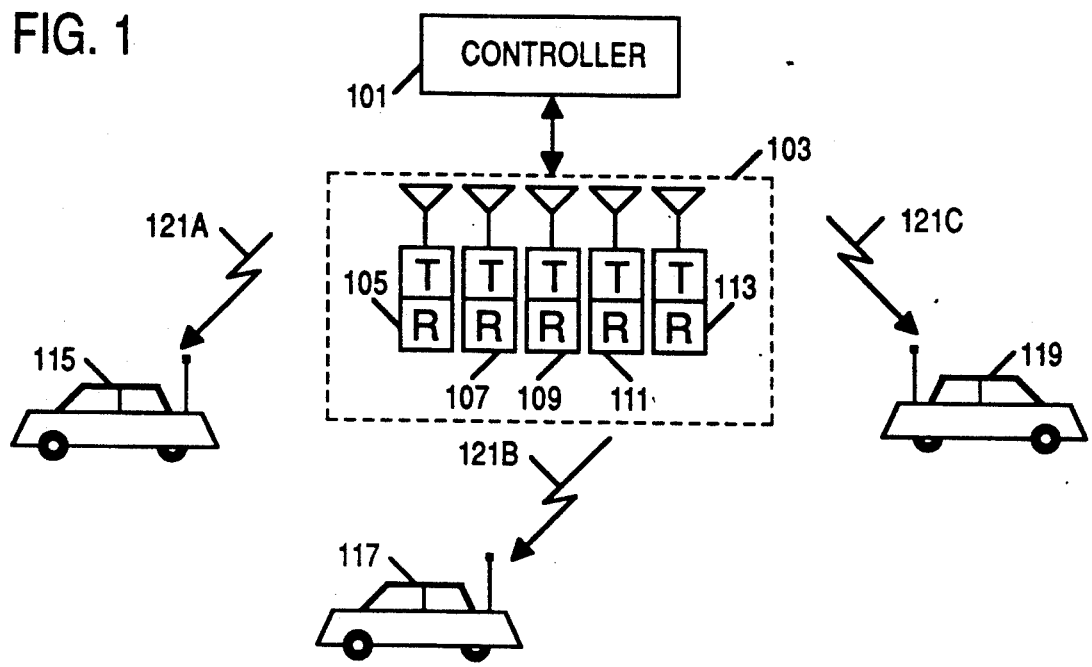
FIG. 1 is a block diagram of a trunked radio system in accordance with the invention.

FIG. 1 is a block diagram of a trunked radio system in accordance with the invention. The system shown is comprised of a controller 101, a base station site 103 controlled by the controller 101, and three mobile trunked communication units 115, 117, and 119. There are five base stations 105, 107, 109, 111, and 113 at the base station site 103. The first base station 105 is designated as the control channel base station. An OSW, such as a system status OSW, is transmitted by the base station 105 on the control channel. Mobile 115 receives the OSW on path 121A, mobile 117 receives the OSW on path 121B, and mobile 119 receives the OSW on path 121C, hence each mobile receives data from the same transmission, but may decode different data due to differing path losses. The controller, also known as a central controller, can either be a separate box, such as a Smartnet ™ Controller, available from Motorola, Inc., or a distributed intelligence among the base stations. The base stations are trunked base stations, such as an MSF5000 trunked base station, and the mobile trunked communication units may be portable radios or mobile radios, such as a MAXTRAC ™ mobile, both available from Motorola, Inc.

Figure 2:
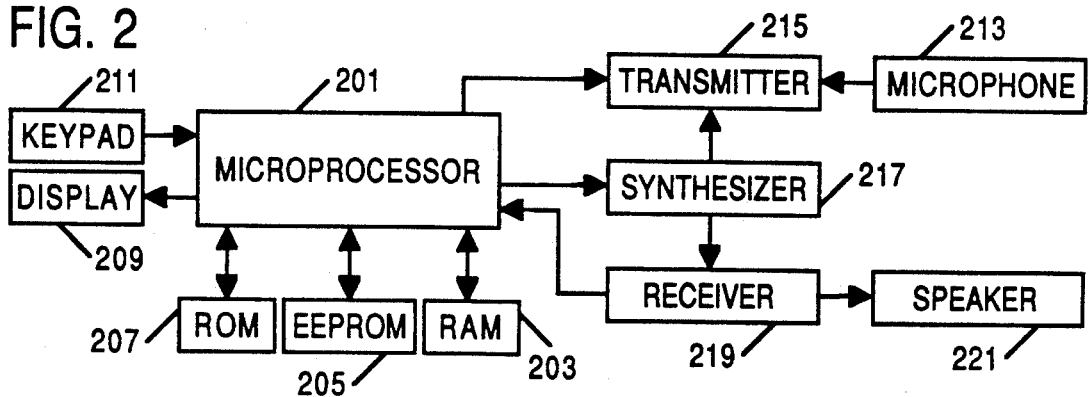
FIG. 2 is a block diagram of a communication unit in accordance with the invention.

FIG. 2 is a block diagram of a communication unit. The communication unit performs control functions in a microprocessor 201, such as an MC68HC11 microprocessor, available from Motorola, Inc. The microprocessor 201 uses ROM 207 to store program information, such as the instructions to perform the steps in a flowchart, EEPROM 205 to store customer options and program data such as connect tone frequency, and RAM 203 to store system status OSW data. The microprocessor 201 is instructed at times to indicate various messages to the operator on the communication unit's display 209. A keypad 211 is available for operator entry of instructions, such as call selection or channel selection. A microphone 213 inputs voice data to a transmitter 215 which performs voice processing before modulating and then transmitting data at the frequency provided by the frequency synthesizer 217. The microprocessor 201 programs the transmitting and receiving frequencies into the frequency synthesizer 217. The receiver 219 receives and demodulates data at the frequency provided by the frequency synthesizer 217, and provides voice processing for audio output to the speaker 221, as is known in the art.

Figure 3A:
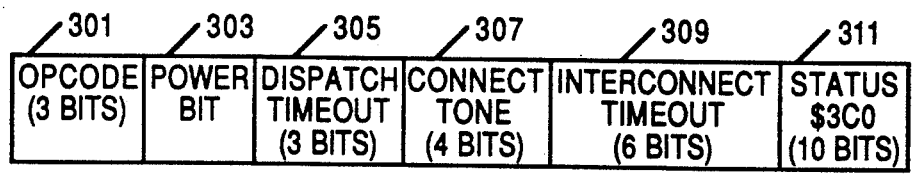
FIG. 3A is a bit field representation of a system status OSW in accordance with the invention.

FIG. 3A is a bit field representation of a system status OSW with connect tone data. The opcode field 301 contains a 3-bit binary opcode. The power field 303 contains a binary power up/down bit. The dispatch time-out field 305 is a 3-bit binary field containing the maximum time currently allowed on the system for a group call, in multiples of 30 seconds (e.g., 000 is 0 seconds, 001 is 30 seconds, 010 is 60 seconds, etc.). The connect tone field 307 contains the 4-bit binary connect tone number corresponding to one of 16 available connect tones. The interconnect time-out field 309 is a 6-bit binary field containing the maximum time allowed for a telephone call, in multiples of 30 seconds. The status field 311 contains 10-bit hexadecimal 3C0 to designate system status OSW. In the preferred embodiment, these 27 bits are error encoded to produce 84 bits of transmitted information.

Figure 3B:
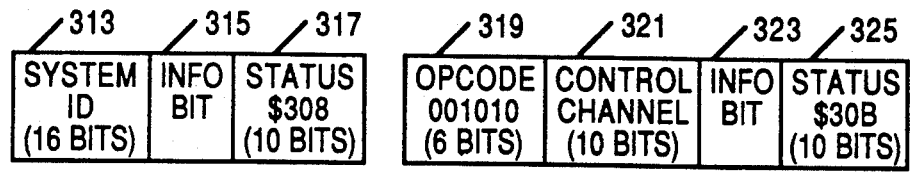
FIG. 3B is a bit field representation of a system ID OSW in accordance with the invention.

FIG. 3B is a bit field representation of a system ID OSW. The system ID OSW is a dual word OSW. The first word is received in an OSW containing fields 313, 315, and 317. The second word is received in an OSW containing fields 319, 321, 323, and 325. The system ID field 313 contains the 16-bit ID that is pre-programmed into each communication unit in the system. The information (info) bit field 315 contains a bit determining the method of talk group affiliation used. The status field 317 contains 10-bit hexadecimal 308 to designate system ID OSW, first word. The opcode field 319 contains six binary bits, for example 001010, to designate the function of the dual word. The control channel field 321 contains the the control channel number designated for this system. The information (info) bit field 323 contains a bit determining the method of talk group affiliation used. The status field 325 contains 10-bit hexadecimal 30B to designate system ID OSW, second word. In the preferred embodiment, each of these 27-bit words are error encoded to produce 84 bits of transmitted information for each word.

FIG. 4 is a flowchart showing system status OSW authentication as performed by the microprocessor 201. The process is entered at communication unit power-up. At step 401, the system flag and all system status OSW RAM is cleared. The control channel is accessed and word sync (synchronization) is established at step 403. If a proper OSW is not decoded at step 405, and the control channel is considered lost at step 407, the procedure continues with step 401. If a proper OSW is not decoded at step 405, and the control channel is not considered lost at step 407, the procedure continues with step 405. If a proper OSW is decoded at step 405, and it is a system ID OSW at step 409, the process continues with step 411. If at step 411 the ID from the received system ID OSW matches the pre-programmed system ID number in the communication unit, the system flag is set at step 413 and the process continues with step 405. If at step 411 the system ID 313 of FIG. 3B from the received system ID OSW does not match the pre-programmed system ID number in the communication unit, the OSW is considered to be from the wrong system and the process continues with step 401, thus preventing programming from an undesired system. If at step 409, the OSW is not a system ID OSW, and the OSW is not a system status OSW at step 415, the OSW is processed appropriately at step 417 and the process continues with step 405. If at step 415 the OSW is a system status OSW and the system flag is set at step 419, the process continues with step 421. If the system flag is not set at step 419, the process continues with step 405, thus preventing a system status OSW programming from an undesired system. The opcode 301 of the system status OSW is determined at step 421. If the opcode 301 is an unknown opcode at step 423, the process continues with step 405. If the opcode 301 is a known opcode at step 423, the 14-bit information (info) field corresponding to this opcode 301 is checked at step 425 against the information field saved in RAM the last time this opcode was received. The 14-bit information field is comprised of the power field 303 (1 bit), dispatch time-out field 305 (3 bits), connect tone field 307 (4 bits), and interconnect time-out field 309 (6 bits) from FIG. 3A. If the 14-bit information field does not match the previous field for the same opcode at step 425, this 14-bit information field is saved in RAM for this opcode and the process continues with step 405. If the 14-bit information field matches the previous field for the same opcode at step 425, this 14-bit information field is saved in RAM for this opcode and the information is processed into the communication unit's EEPROM 205 and the process continues with step 405.

This method also applies to a roaming communication unit, which travels between different systems with which it has access. The flowchart of FIG. 4 is followed in the same manner, except at step 411, the system ID need not match the pre-programmed system ID, but instead the last two system ID OSWs received must be identical to proceed to step 413.

By requiring the last two 14-bit information fields received for a particular opcode to match, the probability of a false decode becomes $(2^{27}/P) \times (84 \text{ bits}/3600 \text{ bps}) \times (1 \text{ year}/31{,}536{,}000 \text{ s})$. If P equals $10^{-4}$, for example, the probability of a false decode is once every 993 years. In a similar system, that requires only the opcode (3 bits) and system status bits (10) to match, the probability of a false decode is once every 22 days with P equals $10^{-4}$.

What is claimed is:

1. A method of message authentication in a communication unit having a pre-programmed system identification (ID) and operating parameters, comprising the steps of:

receiving a first Outbound Signalling Word (OSW) including a system ID;

verifying said system ID from said first OSW when said system ID matches the pre-programmed system ID;

receiving a second OSW including a system status OSW having (a) an opcode and (b) a first information field;

storing said first information field corresponding to said opcode;

receiving a third OSW including a system status OSW having (a) said opcode and (b) a second information field; and programming said second information field into the communication unit according to said opcode when said second information field matches said first information field and said system ID is verified, wherein said second information field comprises connect tone data.

2. A communication unit having a pre-programmed system identification (ID) and operating parameters providing message authentication in a communication system, the communication unit comprising:

means for receiving a first Outbound Signalling Word (OSW) including a system ID;

means, coupled to said means for receiving, for verifying said system ID from said first OSW when said system ID matches the pre-programmed system ID;

means for receiving a second OSW including a system status OSW having (a) an opcode and (b) a first information field;

means, coupled to said means for receiving, for storing said first information field corresponding to said opcode;

means for receiving a third OSW including a system status OSW having (a) said opcode and (b) a second information field; and means, coupled to said means for receiving, for programming said second information field into the communication unit according to said opcode when said second information field matches said first information field and said system ID is verified, wherein said means for programming further comprises means for programming connect tone data from said second information field.

3. A method of message authentication in a communication unit, comprising the steps of:

receiving a first Outbound Signalling Word (OSW) including a first system identification (ID) and a second OSW including a second system ID;

verifying said second system ID from said second OSW when said first system ID matches said second system ID;

receiving a third OSW including a system status OSW having (a) an opcode and (b) a first information field;

storing said first information field corresponding to said opcode;

receiving a fourth OSW including a system status OSW having (a) said opcode and (b) a second information field; and programming said second information field into the communication unit according to said opcode when said second information field matches said first information field and said second system ID is verified, wherein said second information field comprises connect tone data.

4. A communication unit providing message authentication in a communication system, the communication unit comprising:

means for receiving a first Outbound Signalling Word (OSW) including a system identification (ID) and a second OSW including a second system ID;

means, coupled to said means for receiving, for verifying said second system ID from said second OSW when said first system ID matches said second system ID;

means for receiving a third OSW including a system status OSW having (a) an opcode and (b) a first information field;

means, coupled to said means for receiving, for storing said first information field corresponding to said opcode;

means for receiving a fourth OSW including a system status OSW having (a) said opcode and (b) a second information field; and means, coupled to said means for receiving, for programming said second information field into the communication unit according to said opcode when said second information field matches said first information field and said system ID is verified, wherein said means for programming further comprises means for programming connect tone data from said second information field.

* * * * *